May 5, 1953     L. L. LA FONTAINE ET AL     2,637,112

FISHING LINE METER

Filed June 29, 1950

Leon L. LaFontaine
Frank H. Neuman
Inventors

By *Glenn L. Fish*
Attorney

UNITED STATES PATENT OFFICE 2,637,112

FISHING LINE METER

Leon L. La Fontaine, Spokane, Wash., and
Frank H. Neuman, Coeur d'Alene, Idaho

Application June 29, 1950, Serial No. 171,002

1 Claim. (Cl. 33—129)

This invention relates to a fishing line meter or measuring device and it is one object of the invention to provide a device of this character which is adapted to be mounted upon a fishing rod and actuated as line is unwound from a reel, thus indicating the length of line which has been fed from the reel and allowing a fisherman to fish at any predetermined depth or at a predetermined distance from a boat when trolling.

Another object of the invention is to provide a meter or measuring device which may be firmly secured upon a rod in advance of a reel and moved to an adjusted position circumferentially of the rod and thus disposed in such a position that the dial and the pointer of the meter may readily be seen by a person holding the rod.

Another object of the invention is to provide a meter including a casing carried by a bracket which is adapted to be removably secured to a rod by a clamp and thus allow the meter to be easily applied to a rod and also easily removed when it is to be put away or transferred to another rod.

Another object of the invention is to provide a meter wherein its pointer is carried by a shaft constituting one element of gearing which is housed in a casing, the gearing also including a drive shaft which projects from a side of the casing and carries a pulley which is turned by action of a fishing line as the line is unwound from a reel.

The invention is illustrated in the accompanying drawings wherein.

Figure 1:
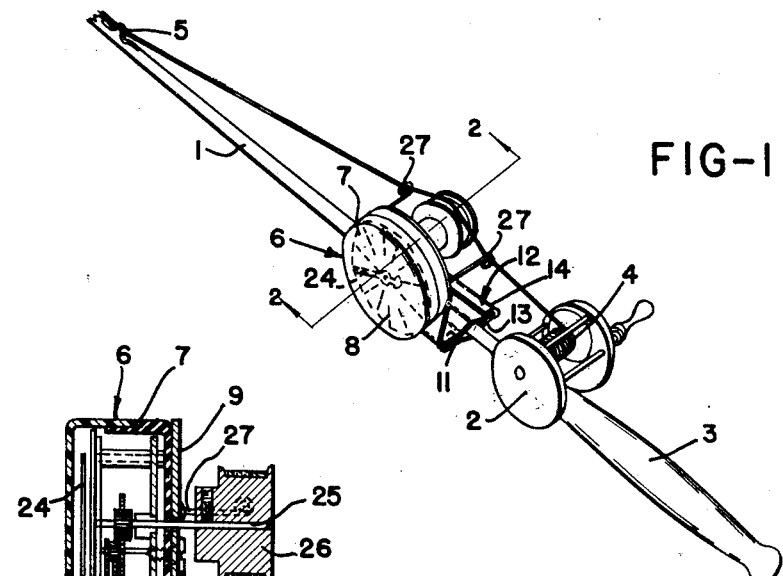
Fig. 1 is a perspective view showing the improved meter mounted upon a fishing rod.
Figure 2:
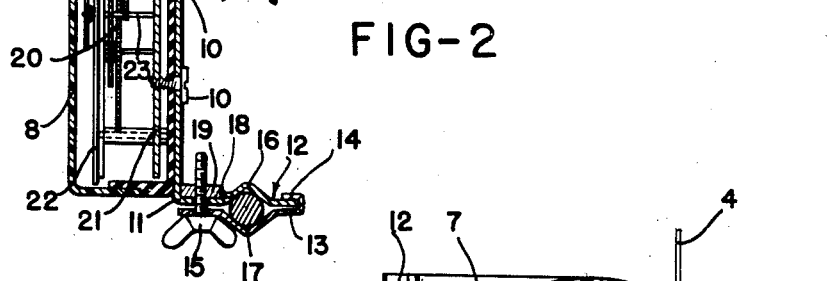
Fig. 2 is a transverse sectional view taken vertically through the meter along the line 2—2 of Figure 1.
Figure 4:
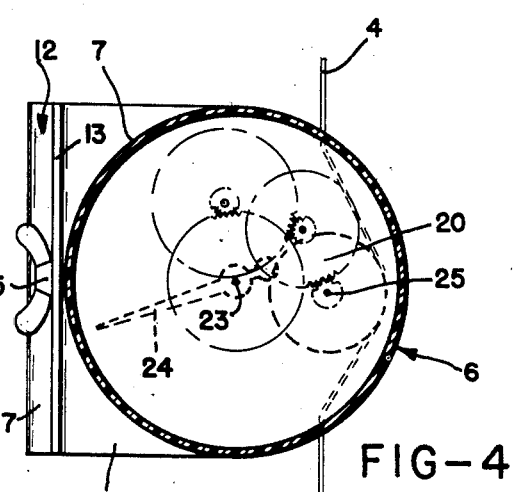
Fig. 4 is a sectional view taken vertically through the meter.
Figure 3:
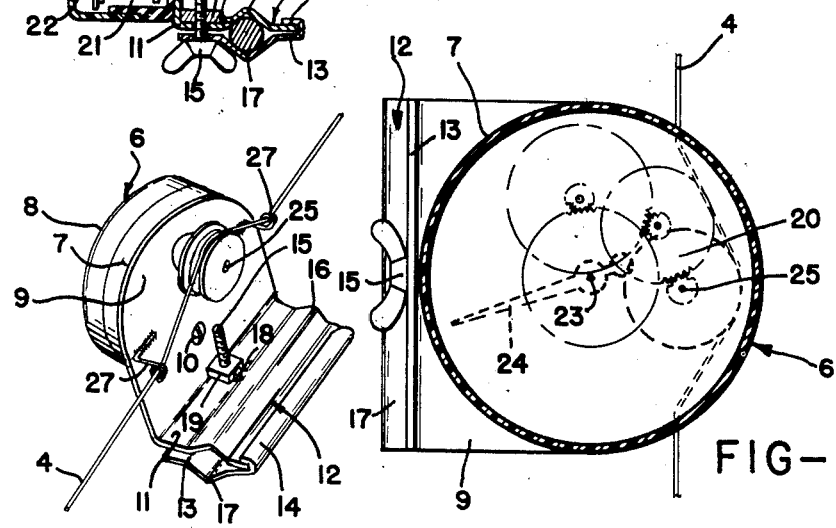
Fig. 3 is a perspective view of the meter looking at the opposite side thereof from that shown in Figure 1.

The improved meter or measuring device constituting the subject matter of this invention is intended for use upon a fishing rod 1 and is provided with means for securing it upon the rod in front of a reel 2 carried by the hand grip or rear section 3 of the rod. The fishing line 4 is wound upon the reel in the usual manner and when it is unwound extends along the rod towards the front end thereof and through the usual line guides 5 carried by the rod.

The meter, which is indicated in general by the numeral 6, has a casing 7 which is of circular outline and open at its front or outer side, this open outer side of the casing being normally closed by a transparent cap or cover 8 which fits tightly about the annular wall of the casing and is frictionally held in place but may be easily removed when necessary. The inner side wall of the casing is secured against a bracket 9 by screws 10 which extend inwardly to secure frame 21. This bracket is formed of stiff sheet metal and has its lower portion bent to form a stationary jaw 11 of a clamp 12. The movable jaw 13 of the clamp is disposed under the stationary jaw and along its outer side edge is formed with a lip or flange 14 which extends upwardly and inwardly from the lower jaw and has overlapping engagement with the outer side edge portion of the upper jaw. Therefore the movable jaw is tiltably supported and when the winged bolt 15 is tightened this jaw will be moved towards the stationary jaw and the portion of the fishing rod which passes between the jaws and fits into the seat formed by the crimped portions 16 and 17 of the jaws will be firmly gripped and the bracket and the casing held in a desired position upon the fishing rod. A tongue 18 which is struck from the upper jaw engages a side edge face of the nut 19 and prevents the nut from turning about the bolt and allowing the jaws to separate accidently after the bolt has been tightened.

Within the casing 7 is a train of gearing 20 carried by a frame 21 with a dial 22 disposed at its front side and clearly visible through the transparent cap 8. The shaft 23 carries a pointer 24 which is disposed in front of the dial and moves about the dial in a circular path to indicate the length of fishing line which has been unreeled when the shaft 23 is rotated by unwinding of the line. The drive shaft 25 of the gearing passes through registering openings formed in the casing and the bracket and protrudes a sufficient distance to carry a pulley 26. This pulley is quite large and is disposed between guides 27 formed with eyes through which the fishing line is threaded. The portion of the fishing line between the guides is engaged with the friction material secured about the pulley and as the line is unwound the pulley and the drive shaft will be turned and rotary motion transmitted to the shaft 23 to cause the pointer to move in a circular path about the dial and indicate the length of fishing line which has been unwound when a cast is made. When the line is rewound upon the reel the pulley and the drive shaft will be turned in a direction to return the pointer to its initial position at the zero mark of the dial. When the fishing rod is taken apart and put away after being used the screw 15 is loosened and the meter detached from the rod, the reel being also removed from the rod. While it is preferred to mount the meter upon the rod it may be mounted upon a portion of the reel if so desired.

Having thus described the invention, what is claimed is:

In a fishing line meter having a pulley adapted to operate an indicator by gearing for measuring fishing line, a casing; a transparent cap closing a side of the casing; a frame in said casing and adapted to pivotally support said gearing, indicator and pulley; a bracket secured to said casing by means of metal screws and having a portion bent away from the casing and forming a stationary jaw of a clamp; said screws extending through said casing and securing said frame therein; a movable jaw under the stationary jaw having an edge portion bent to form a lip disposed in overlapping relation to the stationary jaw and tiltably mounting the movable jaw; a bolt passing through said jaws; a nut for said bolt; a tongue cut from the stationary jaw and engaging an edge face of the nut to prevent displacement of the nut when the bolt is removed; said nut bearing against said bracket to prevent turning of the nut and consequent accidental movement of the movable jaw away from the stationary jaw and out of gripping engagement with a portion of a fishing rod passing between the jaws; and guides carried by said bracket and engageable with a fishing line to hold a portion of the line between the guides in driving contact with the pulley.

LEON L. LA FONTAINE.
FRANK H. NEUMAN.

References Cited in the file of this patent

UNITED STATES PATENTS

| Number | Name | Date |
|---|---|---|
| 130,120 | Finley | Aug. 6, 1872 |
| 139,962 | Keith | June 17, 1873 |
| 898,308 | Broadwater | Sept. 8, 1908 |
| 1,179,661 | Selah | Apr. 18, 1916 |
| 1,321,951 | Thomas | Nov. 18, 1919 |
| 2,468,334 | Kennedy | Apr. 26, 1949 |
| 2,500,026 | Erickson | Mar. 7, 1950 |
| 2,576,629 | Morby | Nov. 27, 1951 |

FOREIGN PATENTS

| Number | Country | Date |
|---|---|---|
| 573,747 | Germany | Apr. 5, 1933 |